(12) United States Patent
Kisch

(10) Patent No.: US 8,454,788 B2
(45) Date of Patent: Jun. 4, 2013

(54) METHOD AND APPARATUS FOR PLACING SHORT COURSES OF COMPOSITE TAPE

(75) Inventor: Robert A. Kisch, Auburn, WA (US)

(73) Assignee: The Boeing Company, Chicago, IL (US)

( * ) Notice: Subject to any disclaimer, the term of this patent is extended or adjusted under 35 U.S.C. 154(b) by 529 days.

(21) Appl. No.: 12/404,265

(22) Filed: Mar. 13, 2009

(65) Prior Publication Data

US 2010/0230043 A1 Sep. 16, 2010

(51) Int. Cl.
*B32B 37/00* (2006.01)
*B65H 81/00* (2006.01)

(52) U.S. Cl.
USPC ........... 156/256; 156/250; 156/425; 156/523; 156/574

(58) Field of Classification Search
USPC ................. 156/250, 166, 175, 173, 256, 361, 156/425, 574, 523
See application file for complete search history.

(56) References Cited

U.S. PATENT DOCUMENTS

| | | |
|---|---|---|
| 799,374 A | 9/1905 | Gray et al. |
| 920,776 A | 5/1909 | Pohl |
| 1,132,837 A | 3/1915 | Eggleston |
| 1,195,554 A | 8/1916 | Bourdin |
| 1,370,339 A | 3/1921 | Midgley |
| 1,420,271 A | 6/1922 | Mclane |
| 1,464,632 A | 8/1923 | Wayne |
| 1,512,096 A | 10/1924 | Hopkinson |
| 1,930,733 A | 10/1933 | Tomlin |
| 2,182,358 A | 12/1939 | Sherts et al. |
| 2,220,760 A | 11/1940 | Gates et al. |
| 2,345,541 A | 3/1944 | Scholze, Jr. |
| 2,722,590 A | 11/1955 | Engler |
| 2,871,716 A | 2/1959 | Stade |
| 3,037,898 A | 6/1962 | Zumofen |
| 3,137,452 A | 6/1964 | Winders |
| 3,329,181 A | 7/1967 | Buss et al. |
| 3,574,040 A | 4/1971 | Chitwood et al. |
| 3,602,416 A | 8/1971 | Basche et al. |
| 3,684,278 A | 8/1972 | Takahaski |
| 3,695,977 A | 10/1972 | Kandelaki et al. |
| 3,775,219 A | 11/1973 | Karlson et al. |
| 3,810,805 A | 5/1974 | Goldsworthy et al. |
| 3,844,822 A | 10/1974 | Boss et al. |
| 3,910,522 A | 10/1975 | Lee et al. |
| 3,970,831 A | 7/1976 | Hegyi |
| 3,992,240 A | 11/1976 | Kuehn, Jr. |
| 4,091,979 A | 5/1978 | Browder |

(Continued)

FOREIGN PATENT DOCUMENTS

| | | |
|---|---|---|
| DE | 2505223 | 8/1976 |
| DE | 20120792 | 5/2003 |

(Continued)

OTHER PUBLICATIONS

EP search report dated Jun. 23, 2010 regarding application EP10250484 (5 pages).

(Continued)

*Primary Examiner* — Jeff Aftergut
(74) *Attorney, Agent, or Firm* — Yee & Associates, P.C.

(57) ABSTRACT

An automatic composite tape placement head includes a roller for compacting tape on a substrate, and a cutter adjacent the roller for cutting the tape at the roller.

16 Claims, 6 Drawing Sheets

U.S. PATENT DOCUMENTS

| | | |
|---|---|---|
| 4,100,004 A | 7/1978 | Moss et al. |
| 4,133,711 A | 1/1979 | August et al. |
| 4,135,447 A | 1/1979 | Barnes et al. |
| 4,186,861 A | 2/1980 | Steinhilber |
| 4,208,238 A | 6/1980 | August et al. |
| 4,234,374 A | 11/1980 | Frank |
| 4,241,884 A | 12/1980 | Lynch |
| 4,259,144 A | 3/1981 | Ballentine |
| 4,267,951 A | 5/1981 | Grant et al. |
| 4,285,752 A | 8/1981 | Higgins |
| 4,292,108 A | 9/1981 | Weiss et al. |
| 4,315,688 A | 2/1982 | Pryor |
| 4,328,061 A | 5/1982 | Off et al. |
| 4,351,992 A | 9/1982 | Crouch |
| 4,382,836 A | 5/1983 | Frank |
| 4,419,170 A | 12/1983 | Blad |
| 4,432,828 A | 2/1984 | Siempelkamp et al. |
| 4,461,669 A | 7/1984 | Dontscheff |
| 4,462,551 A | 7/1984 | Bloch |
| 4,491,493 A | 1/1985 | Eaton |
| 4,506,969 A | 3/1985 | Baker |
| 4,508,584 A | 4/1985 | Charles |
| 4,531,992 A | 7/1985 | Eaton |
| 4,541,886 A | 9/1985 | Marlow et al. |
| 4,557,783 A | 12/1985 | Grone et al. |
| 4,557,790 A | 12/1985 | Wisbey |
| 4,560,433 A | 12/1985 | Frank |
| 4,569,716 A | 2/1986 | Pugh |
| 4,574,029 A | 3/1986 | Murray |
| 4,588,466 A | 5/1986 | Eaton |
| 4,591,402 A | 5/1986 | Evans et al. |
| 4,627,886 A | 12/1986 | Grone et al. |
| 4,636,276 A | 1/1987 | Nozaka |
| 4,680,806 A | 7/1987 | Bolza-Schunemann |
| 4,696,707 A | 9/1987 | Lewis et al. |
| 4,699,683 A | 10/1987 | McCowin |
| 4,706,442 A | 11/1987 | Riemenschneider |
| 4,707,212 A | 11/1987 | Hailey et al. |
| 4,750,965 A | 6/1988 | Pippel et al. |
| 4,781,782 A | 11/1988 | Luhman et al. |
| 4,799,981 A | 1/1989 | Stone et al. |
| 4,842,215 A | 6/1989 | Takami |
| 4,867,834 A | 9/1989 | Alenskis et al. |
| 4,877,471 A | 10/1989 | McCowin et al. |
| 4,878,984 A | 11/1989 | Bourrieres |
| 4,880,488 A | 11/1989 | Matsuo et al. |
| 4,909,880 A | 3/1990 | Kittelson et al. |
| 4,938,824 A | 7/1990 | Youngkeit |
| 4,943,338 A | 7/1990 | Wisbey |
| 4,978,417 A | 12/1990 | Grimshaw et al. |
| 4,990,213 A | 2/1991 | Brown et al. |
| 5,000,397 A | 3/1991 | Darrieux |
| 5,041,179 A | 8/1991 | Shinno et al. |
| 5,045,147 A | 9/1991 | Benson et al. |
| 5,100,493 A | 3/1992 | Leclere et al. |
| 5,110,395 A | 5/1992 | Vaniglia |
| 5,114,519 A | 5/1992 | Grimshaw et al. |
| 5,120,976 A | 6/1992 | Clayton et al. |
| 5,148,572 A | 9/1992 | Wells et al. |
| 5,197,198 A | 3/1993 | Onozato |
| 5,200,018 A | 4/1993 | Gill et al. |
| 5,213,646 A | 5/1993 | Zsolnay et al. |
| 5,249,120 A | 9/1993 | Foley |
| 5,290,386 A | 3/1994 | Trudeau |
| 5,290,389 A | 3/1994 | Shupe et al. |
| 5,294,803 A | 3/1994 | Pahr |
| 5,345,399 A | 9/1994 | Collins |
| 5,397,415 A | 3/1995 | Manabe et al. |
| 5,431,749 A | 7/1995 | Messner |
| 5,448,505 A | 9/1995 | Novak |
| 5,480,508 A | 1/1996 | Manabe et al. |
| 5,482,589 A | 1/1996 | Shin et al. |
| 5,560,942 A | 10/1996 | Curry |
| 5,562,788 A | 10/1996 | Kitson et al. |
| 5,627,647 A | 5/1997 | Baan et al. |
| 5,645,677 A | 7/1997 | Cahuzac et al. |
| 5,659,229 A | 8/1997 | Rajala |
| 5,698,066 A | 12/1997 | Johnson et al. |
| 5,700,347 A | 12/1997 | McCowin |
| 5,725,175 A | 3/1998 | Thundathil |
| 5,879,505 A | 3/1999 | Fujisawa et al. |
| 5,954,917 A | 9/1999 | Jackson et al. |
| 6,041,840 A | 3/2000 | Ogawa |
| 6,073,670 A | 6/2000 | Koury |
| 6,096,164 A | 8/2000 | Benson et al. |
| 6,100,986 A | 8/2000 | Rydningen |
| 6,112,792 A | 9/2000 | Barr et al. |
| 6,164,477 A | 12/2000 | Druckman et al. |
| 6,215,553 B1 | 4/2001 | Rider et al. |
| 6,240,333 B1 | 5/2001 | McGee |
| 6,262,814 B1 | 7/2001 | Furukawa |
| 6,312,247 B1 | 11/2001 | Kassuelke et al. |
| 6,315,235 B1 | 11/2001 | Breyer et al. |
| 6,325,568 B1 | 12/2001 | Druckman et al. |
| 6,391,436 B1 | 5/2002 | Xu et al. |
| 6,436,528 B1 | 8/2002 | Kulper et al. |
| 6,441,905 B1 | 8/2002 | Tojyo et al. |
| 6,451,152 B1 | 9/2002 | Holmes et al. |
| 6,459,494 B1 | 10/2002 | Kurokawa et al. |
| 6,474,389 B1 | 11/2002 | Steelman et al. |
| 6,520,234 B1 | 2/2003 | Anderson et al. |
| 6,544,367 B1 | 4/2003 | Fujimoto et al. |
| 6,638,388 B2 | 10/2003 | Nagata et al. |
| 6,675,688 B2 | 1/2004 | Ostini |
| 6,706,131 B2 | 3/2004 | Steelman et al. |
| 6,748,836 B2 | 6/2004 | Vivirito et al. |
| 6,752,190 B1 | 6/2004 | Boll et al. |
| 6,764,754 B1 | 7/2004 | Hunter et al. |
| 6,767,426 B1 | 7/2004 | Yamamoto |
| 6,773,537 B2 | 8/2004 | Erickson et al. |
| 6,799,081 B1 | 9/2004 | Hale et al. |
| 6,799,619 B2 | 10/2004 | Holmes et al. |
| 6,823,342 B2 | 11/2004 | Wallen et al. |
| 6,860,957 B2 | 3/2005 | Sana et al. |
| 6,900,547 B2 | 5/2005 | Polk, Jr. et al. |
| 6,966,966 B2 | 11/2005 | Koizumi et al. |
| 6,968,971 B2 | 11/2005 | Ely |
| 6,979,501 B2 | 12/2005 | Merton |
| 6,984,429 B2 | 1/2006 | Thunhorst et al. |
| 7,010,544 B2 | 3/2006 | Wallen et al. |
| 7,048,024 B2 | 5/2006 | Clark et al. |
| 7,063,118 B2 * | 6/2006 | Hauber et al. ................ 156/486 |
| 7,137,182 B2 | 11/2006 | Nelson |
| 7,206,665 B2 | 4/2007 | Groppe |
| 7,213,629 B2 | 5/2007 | Leder et al. |
| 7,282,107 B2 | 10/2007 | Johnson et al. |
| 7,293,590 B2 | 11/2007 | Martin |
| 7,326,312 B1 | 2/2008 | Rust et al. |
| 7,337,818 B2 | 3/2008 | Briese et al. |
| 7,341,086 B2 | 3/2008 | Nelson et al. |
| 7,376,480 B2 | 5/2008 | Hagen et al. |
| 7,407,556 B2 | 8/2008 | Oldani et al. |
| 7,419,031 B2 | 9/2008 | Liguore et al. |
| 7,455,740 B2 | 11/2008 | Bostanjoglo et al. |
| 7,455,742 B2 | 11/2008 | Ledet et al. |
| 7,472,736 B2 | 1/2009 | Kisch et al. |
| 7,478,780 B2 | 1/2009 | Wilding et al. |
| 7,517,426 B2 | 4/2009 | Mano et al. |
| 7,527,084 B2 | 5/2009 | Kaczkowski |
| 7,536,242 B2 | 5/2009 | Ledet et al. |
| 7,591,294 B2 | 9/2009 | Wampler et al. |
| 7,643,970 B2 | 1/2010 | Drumheller et al. |
| 7,681,615 B2 | 3/2010 | McCowin |
| 7,717,151 B2 | 5/2010 | Wampler et al. |
| 7,747,421 B2 | 6/2010 | Tang et al. |
| 7,748,425 B2 | 7/2010 | Tingley |
| 7,766,063 B2 | 8/2010 | Lauder et al. |
| 7,769,481 B2 | 8/2010 | Tang et al. |
| 7,809,454 B2 | 10/2010 | Hu et al. |
| 7,824,512 B2 | 11/2010 | Lauder et al. |
| 7,842,145 B2 | 11/2010 | Hogg |
| 7,849,903 B2 | 12/2010 | Vaniglia |
| 7,867,352 B2 | 1/2011 | Johnson et al. |
| 7,922,856 B2 | 4/2011 | Hagman et al. |
| 8,029,642 B2 | 10/2011 | Hagman |
| 8,147,637 B2 | 4/2012 | Kisch et al. |
| 8,156,988 B2 | 4/2012 | Torres Martinez |

| | | | |
|---|---|---|---|
| 8,205,532 B2 | 6/2012 | DeVlieg et al. | |
| 2003/0015298 A1 | 1/2003 | Steelman et al. | |
| 2003/0102070 A1 | 6/2003 | Black et al. | |
| 2003/0145932 A1 | 8/2003 | Holmes et al. | |
| 2004/0026025 A1 | 2/2004 | Sana et al. | |
| 2004/0112534 A1 | 6/2004 | Koizumi et al. | |
| 2004/0226651 A1 | 11/2004 | Ledet et al. | |
| 2005/0016671 A1* | 1/2005 | Sharp | 156/269 |
| 2005/0039842 A1 | 2/2005 | Clark et al. | |
| 2005/0039843 A1 | 2/2005 | Johnson et al. | |
| 2005/0194210 A1 | 9/2005 | Panossian | |
| 2005/0227124 A1 | 10/2005 | Merton | |
| 2005/0247396 A1 | 11/2005 | Oldani et al. | |
| 2006/0073309 A1 | 4/2006 | Hogg | |
| 2006/0090856 A1 | 5/2006 | Nelson et al. | |
| 2006/0106507 A1 | 5/2006 | Ledet et al. | |
| 2006/0118244 A1 | 6/2006 | Zaballos et al. | |
| 2006/0147669 A1 | 7/2006 | Mano et al. | |
| 2006/0162143 A1 | 7/2006 | Nelson et al. | |
| 2006/0180270 A1 | 8/2006 | Ledet et al. | |
| 2006/0260751 A1 | 11/2006 | Lauder et al. | |
| 2007/0029030 A1 | 2/2007 | McCowin | |
| 2007/0034340 A1 | 2/2007 | Kaczkowski | |
| 2007/0039434 A1 | 2/2007 | DeVlieg et al. | |
| 2007/0044896 A1 | 3/2007 | Tingley | |
| 2007/0044900 A1 | 3/2007 | Tingley | |
| 2007/0069080 A1 | 3/2007 | Rassaian et al. | |
| 2007/0102239 A1 | 5/2007 | Liguore et al. | |
| 2007/0106407 A1 | 5/2007 | Drumheller et al. | |
| 2007/0106418 A1 | 5/2007 | Hagen et al. | |
| 2007/0144676 A1 | 6/2007 | Tang et al. | |
| 2007/0150087 A1 | 6/2007 | Tang et al. | |
| 2007/0187024 A1 | 8/2007 | Johnson et al. | |
| 2007/0234907 A1 | 10/2007 | Torres Martinez | |
| 2008/0277057 A1 | 11/2008 | Montgomery et al. | |
| 2008/0282863 A1 | 11/2008 | McCowin | |
| 2008/0302483 A1* | 12/2008 | Vaniglia | 156/361 |
| 2009/0025875 A1 | 1/2009 | Hagman | |
| 2009/0076638 A1 | 3/2009 | Hu et al. | |
| 2009/0078361 A1 | 3/2009 | Kisch et al. | |
| 2009/0079998 A1 | 3/2009 | Anderson et al. | |
| 2009/0082892 A1 | 3/2009 | Tang et al. | |
| 2009/0166467 A1 | 7/2009 | Hagman et al. | |
| 2009/0205767 A1 | 8/2009 | Lauder et al. | |
| 2009/0211698 A1 | 8/2009 | McCowin | |
| 2010/0006205 A1 | 1/2010 | McCowin et al. | |
| 2010/0193103 A1 | 8/2010 | McCowin | |
| 2010/0224716 A1 | 9/2010 | McCowin | |
| 2011/0114265 A1 | 5/2011 | Hagman et al. | |
| 2011/0277941 A1 | 11/2011 | Hagman et al. | |
| 2013/0037649 A1 | 2/2013 | McCowin | |

FOREIGN PATENT DOCUMENTS

| | | |
|---|---|---|
| DE | 10342658 | 4/2005 |
| EP | 1775108 A1 * | 4/2007 |
| EP | 1804146 | 7/2007 |
| EP | 1859917 | 11/2007 |
| EP | 1977882 | 10/2008 |
| EP | 1992473 | 11/2008 |
| EP | 2077246 | 7/2009 |
| EP | 2228200 A1 | 3/2010 |
| EP | 2228333 | 9/2010 |
| ES | 2253005 | 5/2006 |
| ES | 2005/000408 | 4/2007 |
| GB | 2065566 | 7/1981 |
| JP | 05126536 | 5/1993 |
| JP | 07182724 | 7/1995 |
| JP | 08327330 | 12/1996 |
| JP | 09210665 | 8/1997 |
| JP | 2006347121 | 12/2006 |
| SU | 1019227 | 5/1983 |
| WO | 0196223 A1 | 12/2001 |
| WO | WO03035380 | 5/2003 |
| WO | WO2005030458 | 4/2005 |
| WO | WO2005105641 | 11/2005 |
| WO | WO2006021601 | 3/2006 |
| WO | 2006060270 A1 | 6/2006 |
| WO | WO2006101379 | 9/2006 |
| WO | WO2006118692 | 11/2006 |
| WO | WO2009038895 | 3/2009 |
| WO | WO2009038943 | 3/2009 |
| WO | WO2009108517 | 9/2009 |
| WO | WO2010005996 | 1/2010 |

OTHER PUBLICATIONS

USPTO Notice of Allowance, dated Jul. 9, 2012, regarding U.S. Appl. No. 13/012,617, 36 pages.

USPTO Supplemental Notice of Allowance, dated Jul. 31, 2012, regarding U.S. Appl. No. 12/400,600, 4 pages.

Ashizawa et al., "Manufacturing Technology for Polymer Composite Structures," JTEC Panel Report on Advanced Manufacturing Technology for Polymer Composite Structures in Japan, Apr. 1994, 20 pages.

Cincinnati Milacron, "Into the Future With Better Ways to Automate the Manufacture of Composite Parts," Cincinnati Milacron Publication No. SP-152-3, 1998, 22 pages.

Collins, "Measuring Small," Computer Technology Review, vol. XXV No. 3, 2005, 5 pages.

European Search Report dated Sep. 15, 2008, regarding Application No. EP08008877 (EP1992473), 3 pages.

European Search Report dated Nov. 30, 2010, regarding Application No. EP08173139 (EP2077246), 2 pages.

European Search Report dated Jun. 7, 2010, regarding Application No. EP10250405 (EP2228333), 2 pages.

Evans et al., "Fiber Placement Process Study," SAMPE 34th Symposium Book of Proceedings, Reno, NV, May 8-11, 1989, pp. 1822-1833.

Guillermin, "Advanced Composite Engineering using MSC.Pantran and FiberSIM." Composite Design Technologies, Jul. 20, 2004, 15 pages.

International Search Report dated Apr. 1, 2005, regarding Application No. PCT/US2004/015144 (WO2005030458), 2 pages.

International Search Report dated Aug. 30, 2006, regarding Application No. PCT/US2006/010704 (WO2006118692), 3 pages.

International Search Report dated Dec. 3, 2008, regarding Application No. PCT/US2008/072450 (WO2009038895), 3 pages.

International Search Report dated Mar. 2, 2009, regarding Application No. PCT/US2008/074612 (WO2009038943), 4 pages.

International Search Report dated May 28, 2009 regarding Application No. PCT/US2009/034048 (WO2009108517), 2 pages.

International Search Report dated Feb. 5, 2010, regarding Application No. PCT/US2009/049850 (WO2010005996), 2 pages.

Koschmieder et al., "On-Line Tow Width Measurement in Filament Winding," Proceedings of the 45th International SAMPE Symposium and Exhibition, Long Beach, CA, May 21-25, 2000, pp. 1417-1426.

Morrison et al., "Automatic Controlled Apparatus for Producing Tobacco Smoke Filter Rods," USPTO Defensive Publication No. T941,011, Dec. 2, 1975, 3 pages.

Olsen et al., "Automated Composite Tape Lay-up Using Robotic Devices," Proceedings of the International Conference on Robotics and Automation, Atlanta, GA, May 1993, pp. 291-297.

USPTO Office Action dated Jan. 11, 2005 regarding U.S. Appl. No. 10/437,067, 10 pages.

USPTO Final Office Action dated Jul. 1, 2005 regarding U.S. Appl. No. 10/437,067, 9 pages.

USPTO Office Action dated Feb. 17, 2006 regarding U.S. Appl. No. 10/437,067, 10 pages.

USPTO Notice of Allowance dated Sep. 13, 2006 regarding U.S. Appl. No. 10/437,067, 7 pages.

USPTO Supplemental Notice of Allowance dated Dec. 27, 2006 regarding U.S. Appl. No. 10/437,067, 4 pages.

USPTO Office Action dated Feb. 6, 2008 regarding U.S. Appl. No. 11/116,222, 13 pages.

USPTO Final Office Action dated Sep. 5, 2008 regarding U.S. Appl. No. 11/116,222, 12 pages.

USPTO Notice of Allowance dated Mar. 27, 2009 regarding U.S. Appl. No. 11/116,222, 4 pages.

USPTO Office Action dated Jun. 6, 2009 regarding U.S. Appl. No. 11/116,222, 11 pages.

USPTO Office Action dated Nov. 24, 2009 regarding U.S. Appl. No. 11/116,222, 9 pages.
USPTO Notice of Allowance dated Mar. 25, 2010 regarding U.S. Appl. No. 11/116,222, 5 pages.
USPTO Office Action dated Feb. 1, 2010 regarding U.S. Appl. No. 12/423,472, 36 pages.
USPTO Office Action dated Jul. 8, 2010 regarding U.S. Appl. No. 12/423,472, 25 pages.
USPTO Notice of Allowance dated Sep. 17, 2010 regarding U.S. Appl. No. 12/423,472, 6 pages.
USPTO Office Action dated Mar. 5, 2008 regarding U.S. Appl. No. 11/196,455, 12 pages.
USPTO Final Office Action dated Jul. 17, 2008 regarding U.S. Appl. No. 11/196,455, 11 pages.
USPTO Office Action dated Jan. 28, 2009 regarding U.S. Appl. No. 11/196,455, 10 pages.
USPTO Final Office Action dated Jul. 9, 2009 regarding U.S. Appl. No. 11/196,455, 8 pages.
USPTO Notice of Allowance dated Nov. 4, 2009 regarding U.S. Appl. No. 11/196,455, 8 pages.
USPTO Office Action dated Aug. 13, 2009 regarding U.S. Appl. No. 11/750,154, 9 pages.
USPTO Office Action dated Dec. 28, 2009 regarding U.S. Appl. No. 11/750,154, 7 pages.
USPTO Office Action dated May 25, 2010 regarding U.S. Appl. No. 11/750,154, 7 pages.
USPTO Final Office Action dated Sep. 14, 2010 regarding U.S. Appl. No. 11/750,154, 5 pages.
USPTO Office Action dated Aug. 21, 2009 regarding U.S. Appl. No. 11/856,372, 21 pages.
USPTO Final Office Action dated Jan. 27, 2010 regarding U.S. Appl. No. 11/856,372, 16 pages.
USPTO Notice of Allowance dated Apr. 30, 2010 regarding U.S. Appl. No. 11/856,372, 4 pages.
USPTO Supplemental Notice of Allowance dated Jul. 21, 2010 regarding U.S. Appl. No. 11/856,372, 2 pages.
USPTO Office Action dated Sep. 15, 2010 regarding U.S. Appl. No. 11/829,525, 11 pages.
USPTO Final Office Action dated Feb. 2, 2011 regarding U.S. Appl. No. 11/829,525, 12 pages.
USPTO Notice of Allowance dated Jun. 21, 2011 regarding U.S. Appl. No. 11/29,525, 8 pages.
USPTO Office Action dated Mar. 31, 2010 regarding U.S. Appl. No. 11/859,745, 18 pages.
USPTO Final Office Action dated Oct. 14, 2010 regarding U.S. Appl. No. 11/859,745, 22 pages.
USPTO Office Action dated Mar. 28, 2011 regarding U.S. Appl. No. 11/859,745, 24 pages.
USPTO Notice of Allowance dated Jun. 8, 2012 regarding U.S. Appl. No. 11/859,745, 40 pages.
USPTO Supplemental Notice of Allowance dated Jun. 19, 2012 regarding U.S. Appl. No. 11/859,745, 38 pages.
USPTO Office Action dated Jun. 21, 2010 regarding U.S. Appl. No. 13/189,160, 45 pages.
USPTO Notice of Allowance, dated Jun. 28, 2012, regarding U.S. Appl. No. 12/400,600, 64 pages.
USPTO Ex Parte Quayle Action dated Jan. 4, 2012 regarding U.S. Appl. No. 11/859,745, 9 pages.
USPTO Notice of Allowance dated Feb. 13, 2012 regarding U.S. Appl. No. 11/859,745, 9 pages.
USPTO Office Action dated Aug. 19, 2010 regarding U.S. Appl. No. 11/968,542, 10 pages.
USPTO Notice of Allowance dated Dec. 17, 2010 regarding U.S. Appl. No. 11/968,542, 9 pages.
USPTO Notice of Allowance dated Apr. 25, 2012 regarding U.S. Appl. No. 13/012,617, 16 pages.
USPTO Office Action dated May 17, 2011 regarding U.S. Appl. No. 12/038,155, 11 pages.
USPTO Final Office Action dated Oct. 19, 2011 regarding U.S. Appl. No. 12/038,155, 9 pages.
USPTO Office Action dated Nov. 7, 2011 regarding U.S. Appl. No. 12/498,307, 15 pages.
USPTO Final Office Action dated Mar. 8, 2012 regarding U.S. Appl. No. 12/498,307, 14 pages.
USPTO Office Action dated May 10, 2011 regarding U.S. Appl. No. 12/363,749, 10 pages.
USPTO Final Office Action dated Feb. 21, 2012 regarding U.S. Appl. No. 12/363,749, 7 pages.
Office Action, dated Feb. 1, 2013, regarding USPTO U.S. Appl. No. 12/363,749, 45 pages.
Notice of Allowance, dated Feb. 19, 2013, regarding USPTO U.S. Appl. No. 13/189,160, 18 pages.

* cited by examiner

METHOD AND APPARATUS FOR PLACING SHORT COURSES OF COMPOSITE TAPE

TECHNICAL FIELD

This disclosure generally relates to automated methods and equipment for laying up plies of composite material, and deals more particularly with a method and apparatus for placing short courses of composite tape on a substrate during the layup process.

BACKGROUND

Composite structures such as those used in the automotive, marine and aerospace industries may be fabricated using automated composite material application machines, commonly referred to as automated fiber placement (AFP) machines. AFP machines may be used in the aircraft industry, for example, to fabricate structural components and skins by placing relatively narrow strips of composite, slit fiber tape or "tows" on a manufacturing tool. The tape may be placed on the tool in parallel courses that may be in substantially edge-to-edge contact to form a ply.

Known AFP machines employ a tape placement head that dispenses, cuts and compacts courses of tape onto the tool surface as a tape placement head is moved by a robotic device over the tool surface. These tape placement heads typically include a supply spool of tape, and a dispensing mechanism that draws the tape from the spool and guides the tape into a nip between a compaction roller and the tool surface. A cutter blade within the dispensing mechanism located upstream from the compaction roller cuts the tape to a desired course length. The minimum length of a tape course that can be placed by the tape placement head may therefore be governed by the distance between the point where the tape is compacted onto the tool surface and the point where the tape is cut by the blade.

In some applications, relatively short courses may be required which have a length less than the minimum course length that can be cut by known tape heads. In other words, a desired course length may be less than the distance from the compaction point to the point where the cut is made. Under these circumstances, it may be necessary to place courses that are longer than optimum course lengths, thereby adding weight and/or cost to the part, or prompting the need to trim the plies of excess tape.

Accordingly, there is a need for a tape placement head and method for cutting courses of tape which allow placement of courses of shorter length.

SUMMARY

According to the disclosed embodiments, short courses of composite tape may be placed by automated tape placement heads by cutting the tape within the head at a point that is as close as possible to the compaction point. Cutting short courses is made possible by locating a cutter in close proximity to the compaction roller in order to minimize the distance between the compaction point and the point where the tape is cut. The compaction roller may be used as an anvil against which the tape is held while being cut by a cutter blade that may impinge upon the roller during a cut. The cutter may include a rotary cutter blade, or a guillotine type cutter blade.

According to one disclosed embodiment, an automatic composite tape placement head comprises a roller for compacting tape on a substrate. A cutter adjacent the roller cuts the tape at the roller. The cutter may include a rotary cutter blade or a reciprocating cutter blade.

According to another embodiment, an automatic tape placement head is provided for placing composite tape on a substrate. The head includes a supply of tape and a roller for compacting the tape against the substrate as the head moves over the substrate. Means are provided for feeding the tape from the tape supply to the roller. A cutter is provided for cutting the tape against the roller. The cutter may be a rotary cutter positioned adjacent the roller which rotates in a direction opposite the rotational direction of the roller. Means may be provided for synchronizing the operation of the cutter with the feeding of the tape from the tape supply to the roller. The cutter may be located to cut the tape substantially at a tangent point on the surface of the roller.

According to another embodiment, a method is provided of cutting composite tape for placement on a substrate by an automatic tape placement head. The method includes feeding composite tape from a supply of the tape to a roller on the head. The tape is cut at the roller, and the roller is used to compact the cut tape against the substrate. The cutting of the tape may be performed by a rotary cutter or by a reciprocating cutter. Cutting the tape may include using the roller as an anvil against which the tape is held during a cut.

The disclosed embodiments satisfy the need for cutting tape dispensed by the automatic tape placement head at a location that is as close as possible to the point of tape compaction on the substrate, in order to allow short tape courses of minimum length to be placed on the substrate.

BRIEF DESCRIPTION OF THE ILLUSTRATIONS

DETAILED DESCRIPTION

Figure 1:
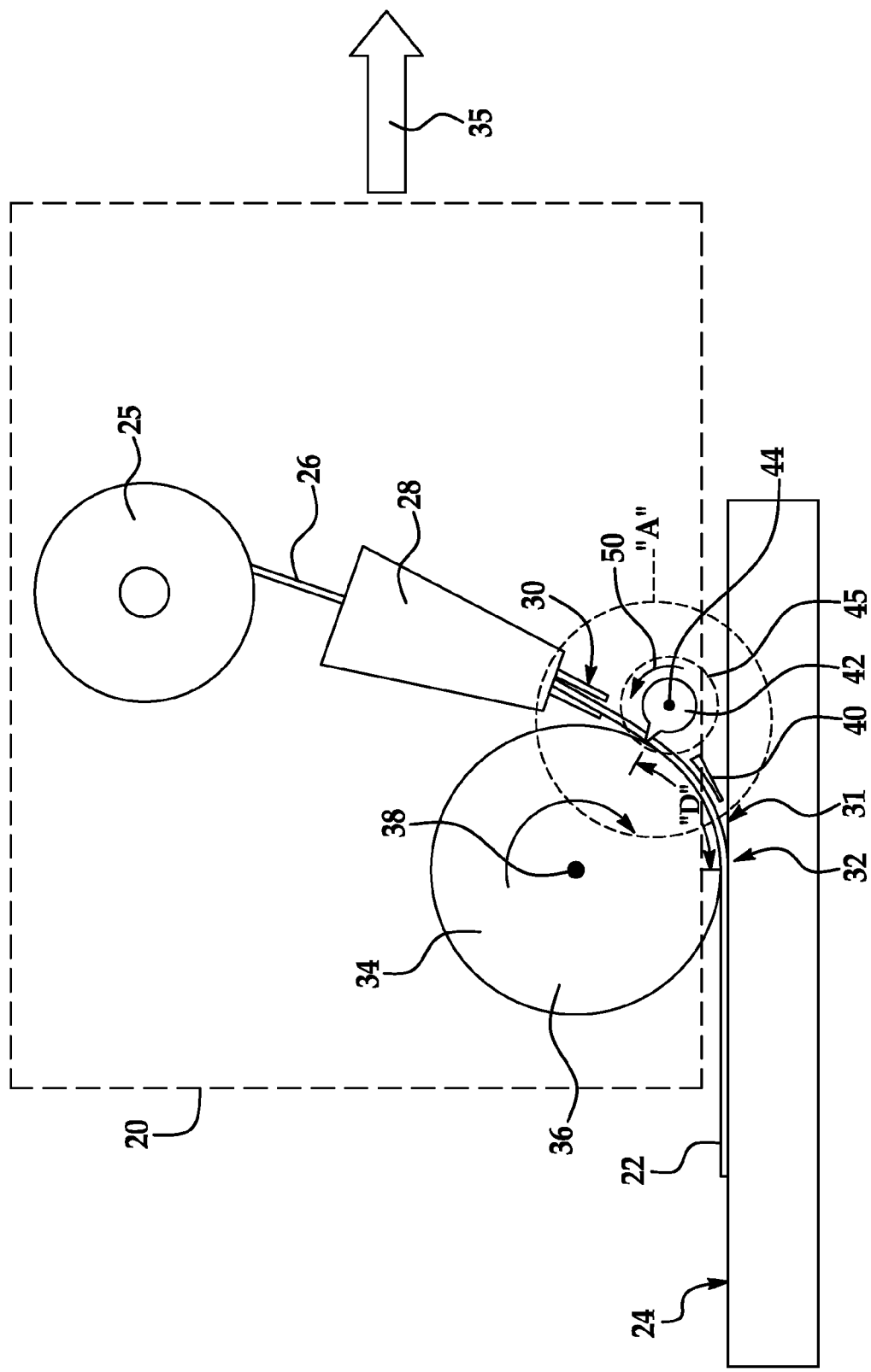
FIG. 1 is an illustration of a side view of automated apparatus for placing short courses of composite tape on a substrate.

Referring first to FIG. 1, disclosed embodiments broadly relate to a tape placement head 20 forming part of an automatic fiber placement machine (not shown). The head 20 is used to place and compact courses 22 of fiber reinforced prepreg tape 26 on a substrate, such as a tool surface 24. The head 20 broadly includes a supply spool 25 of the tape 26, a dispensing mechanism 28, a cutter 42 for cutting the tape 26 and a compaction roller 34 for compacting the courses 22 on the substrate 24, as the head moves over the tool surface 24, indicated by the arrow 35.

Figure 2:
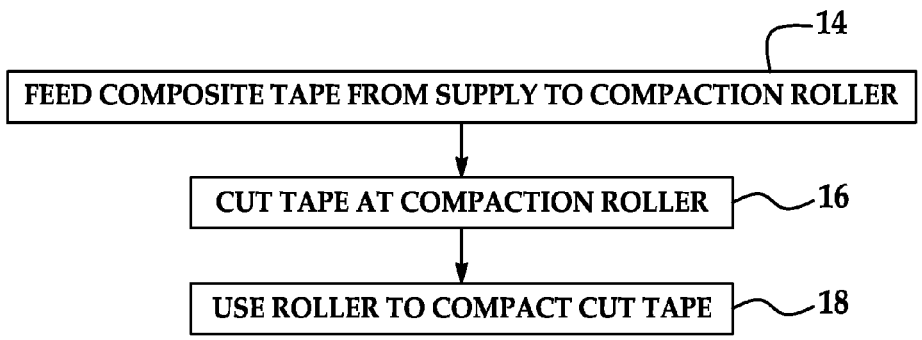
FIG. 2 is an illustration of the steps of a method for placing courses of composite tape on a substrate according to the disclosed embodiments.

Referring now momentarily to FIG. 2, the tape head 20 may be employed in a method of placing courses 22 of tape 26 on the tool surface 24. Beginning at 14, tape 26 is fed from the supply spool 25 to the compaction roller 34. As the tape 26 is being fed to the compaction roller 34, the tape 26 is cut at the location of the compaction roller 34, downstream of the dispensing mechanism 28, as shown at step 16. Then, at 18, the compaction roller 34 is used to compact the course 22 of tape 26 onto a substrate such as the tool surface 24.

Figure 3:
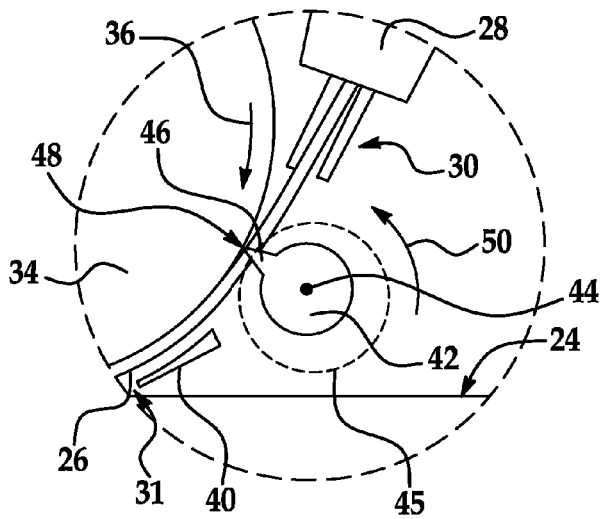
FIG. 3 is an illustration of the area designates as "A" shown in FIG. 1.

Referring now to FIGS. 1 and 3, the dispensing mechanism 28 may include various components (not shown) which add, feed and guide the tape 26 as it is drawn from the spool 25 and fed to the roller 34. For example, guides 30 are illustrated which train the tape 26 onto the roller 34. Further details of the dispensing mechanism 28 may be found in U.S. Pat. Nos. 4,699,683 and 7,213,629, and in U.S. patent application Ser. No. 12/038,155 filed Feb. 27, 2008, all of which patents and application are incorporated by reference herein. A deflection plate 40 may be provided to aid in guiding the tape 26 into a nip 31 between the tool surface 24 and the roller 34 where it is compacted against the tool surface 24 at a compaction point 32.

In accordance with the disclosed embodiments, a cutter 42 is mounted for rotation about an axis 44 downstream of the dispensing mechanism 28 and immediately adjacent the compaction roller 34. The cutter 42 includes a cutter blade 46 driven by a servo motor 45 or similar time-based motor. The cutter blade 46 rotates into engagement with the compaction roller 34 at a tangent point 48 where the tape 26 is initially guided onto the roller 34. Cutter 42 rotates in a direction 50 opposite to the direction 36 of rotation of the roller 34 so that the cutter blade 46 is generally moving in the feed direction of the tape 26 during the cut, and therefore does not interfere with the tape feed. In the illustrated embodiment, the axes of rotation 38, 44 of the roller 34 and cutter 42 respectively extend substantially parallel to each other.

From FIGS. 1 and 3, it may be seen that the cutter 42 is located immediately adjacent the roller 34, as close as possible to the compaction point 32 so that the distance "D" between the compaction point 32 and the tangent point 48 where the tape 26 is cut, is minimized. As the blade 46 on the cutter 42 rotates in the direction 50, the blade 46 engages and severs the tape 26, as the tape 26 is held against the compaction roller 34. Thus, the roller 34 acts as an anvil on which the tape 26 is held as it is being cut. The minimum length of a course 22 substantially corresponds to the distance "D" between the compaction point 32 and the tangent point 48 where the tape is cut by the blade 46. During a cut, the blade 46 may slightly impinge upon the roller 34. Depending upon the material selected for the roller 34, the blade 46 may slightly penetrate the roller 34 during a cut, or alternatively, the roller 34 may deflect slightly as the blade 46 impinges upon the roller 34.

Figure 4:
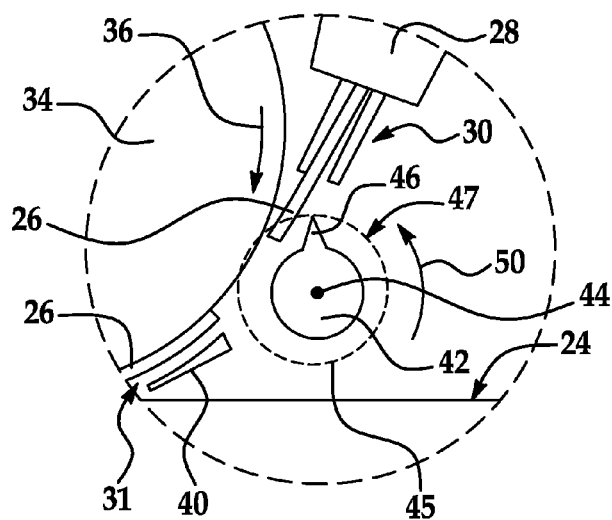
FIG. 4 is an illustration a view similar to FIG. 3, but showing a course of tape shortly after the tape has been cut to length.

FIG. 4 illustrates the tape 26 having been cut, and the blade 46 having progressed slightly further in its rotary path. At this point, the dispensing mechanism 28 stops feeding the tape 26 until the head 20 has been moved to a position over the tool surface 24 where the next course 22 is to be placed. Following a cut, the cutter 42 is indexed to the standby position 47 shown in FIG. 4 and remains stationary at that position until activated to make the next cut.

Figure 5:
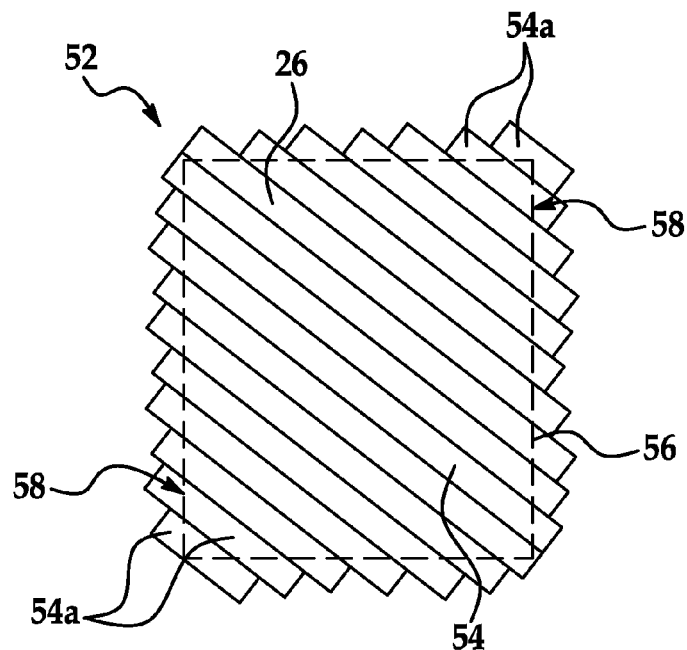
FIG. 5 is an illustration of a plan view of a ply having a 45 degree layup orientation with corner areas requiring short courses of tape.
Figure 6:
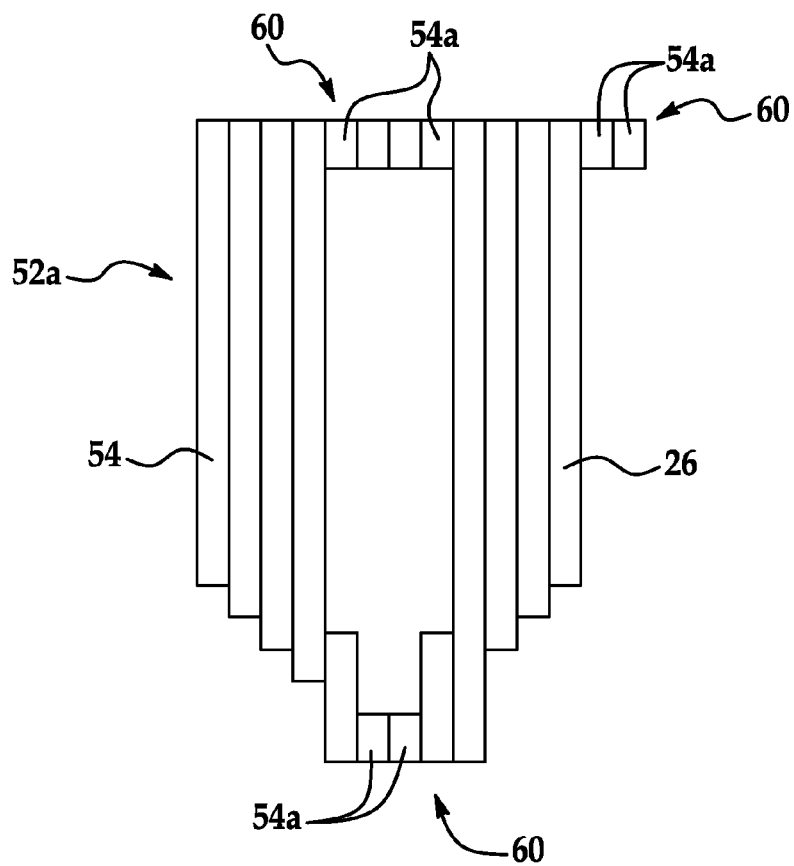
FIG. 6 is an illustration of a plan view of a ply having a 0 degree layup orientation with narrow areas requiring short courses of tape.

FIG. 5 illustrates a typical ply 52 comprising substantially parallel courses 58 of tape 26 with a 45 degree layup orientation covering a generally square part shape indicated by the dashed line 56. The part shape 56 includes corner areas 58 that may be covered with one or more short courses 54a of the tape 26 applied by the placement head 20 previously described. FIG. 6 illustrates another typical ply 52 formed by substantially parallel courses 54 of tape 26 with a 0 degree layup orientation. The ply 52a includes narrow areas 60 that may be covered with short courses 54a of the tape 26.

Figure 7:
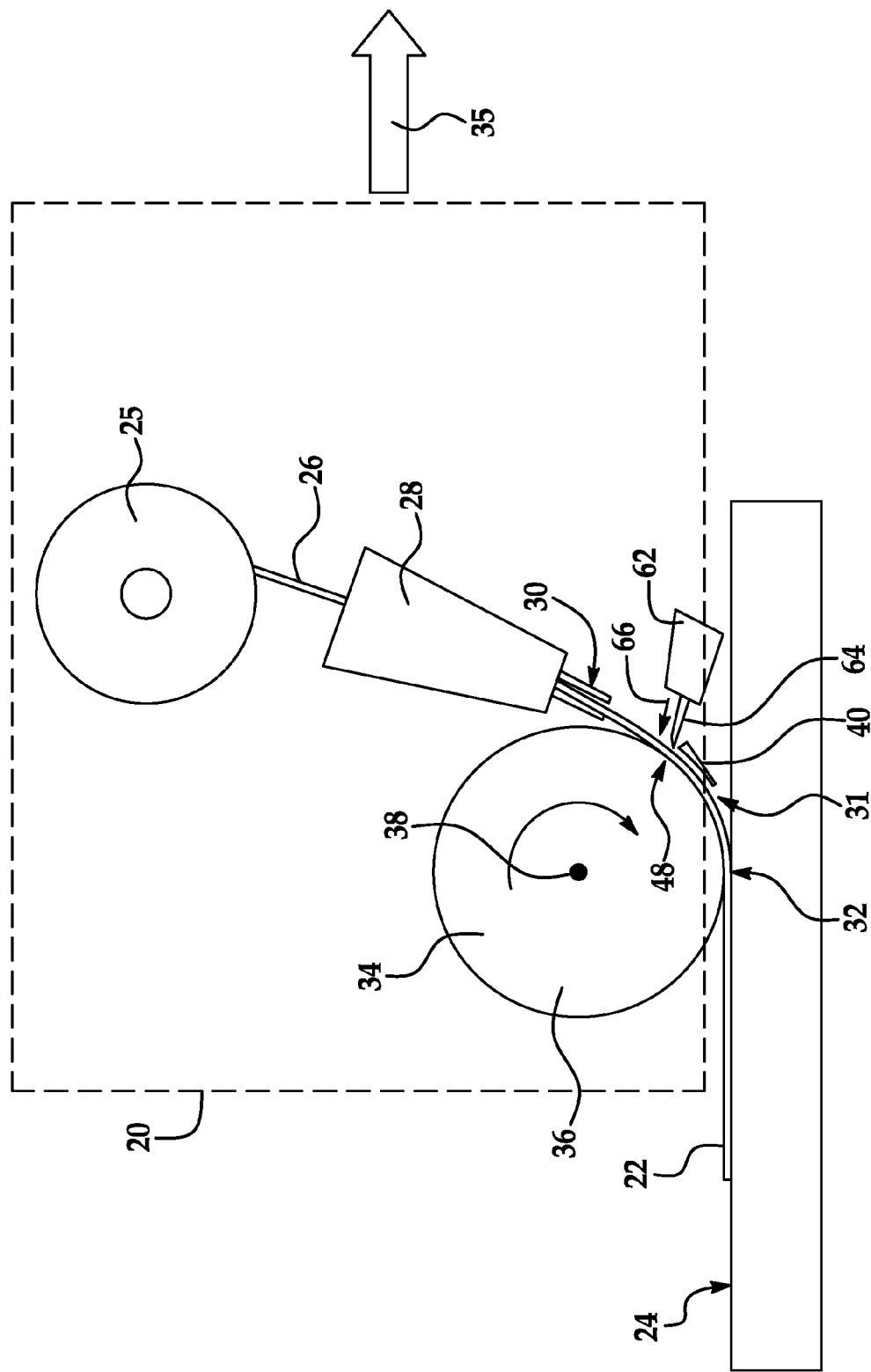
FIG. 7 is an illustration of a side view of an alternate embodiment of the apparatus employing a reciprocating cutter.

Attention is now directed to FIG. 7 which illustrates a head 20 similar to that shown in FIG. 1, but wherein the cutter 42a is a guillotine type cutter in which a reciprocating guillotine blade 64 is displaced toward and away from the compaction roller 34 in the direction of the arrow 66 using a suitable reciprocating drive 62 which may be a servo motor or similar time-based drive. The cutter 42a is positioned immediately adjacent the compaction roller 36, as close as possible to the compaction point 32 so as to minimize the shortest length of course 22 that can be placed by the head 20. In this example, the blade 64 is preferably oriented so as to be generally perpendicular to the tape 26 at the tangent point 48.

Figure 8:
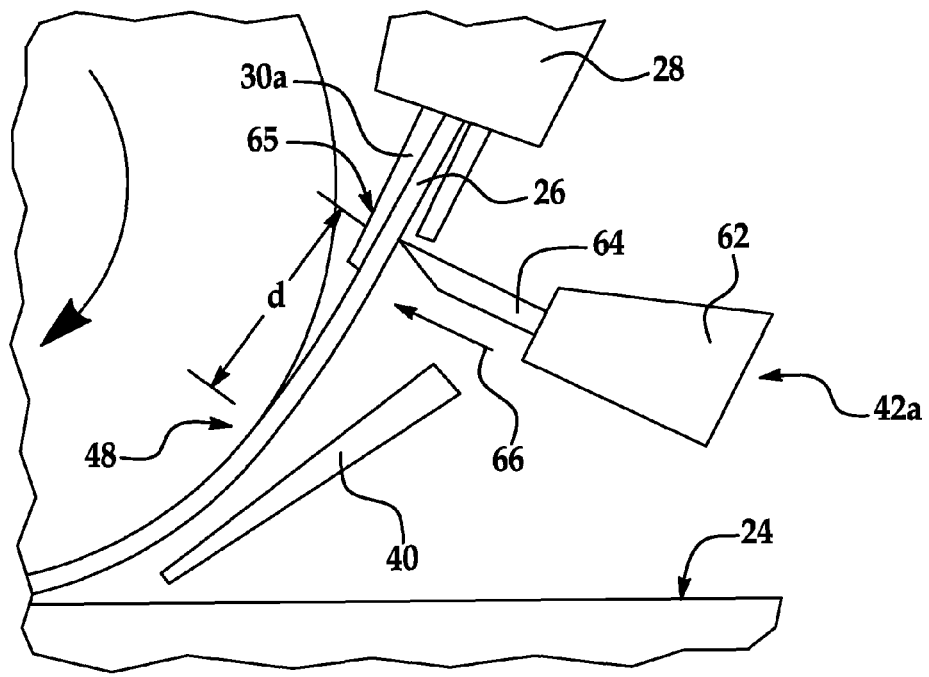
FIG. 8 is an illustration of a side view showing the cutter placed at an alternate location adjacent the compaction roller.

Attention is now directed to FIG. 8 which illustrates an alternate placement location of the cutter 42a. In this embodiment, the cutter 42a is located so that the cutter blade 64 cuts the tape 26 at a location 65 upstream from the tangent point 48 by a distance "d", but nevertheless in close proximity to the roller 34. In this embodiment, one of the guides 30a may be extended slightly so as to act as an anvil against which the tape 26 is held during a cut. The cutter 42a is positioned such that the blade 64 moves toward the guide 30a to cut the tape 26 as the tape 26 is held against the guide 30a. The alternate location of the cutter 42a shown in FIG. 8 may be preferred in some applications where it is desired that the blade 64 not directly contact the roller 34.

Figure 9:
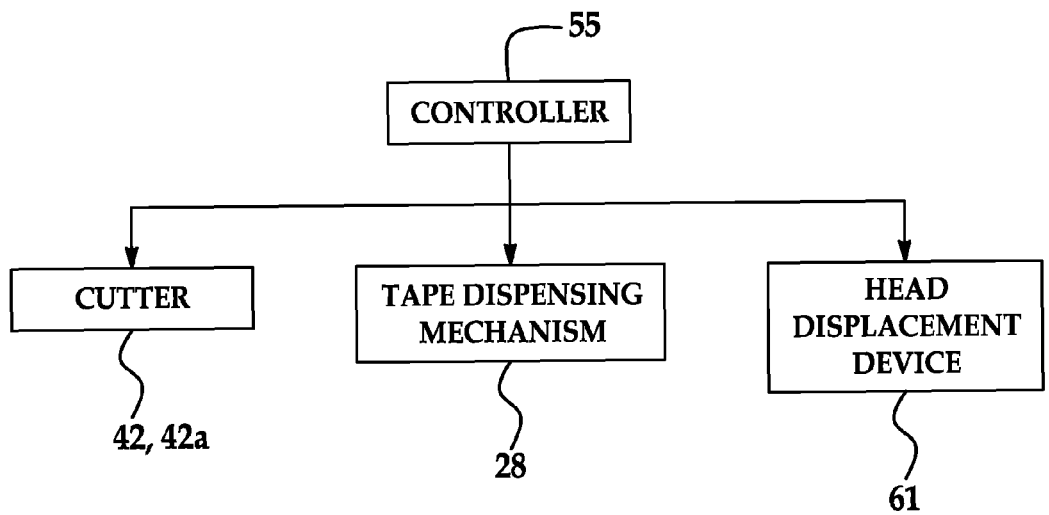
FIG. 9 illustrates a broad block diagram of a control system used to control the operation of the tape head illustrated in FIGS. 1 and 7.

FIG. 9 broadly illustrates the components of a system for controlling the operation of the cutter 42, 42a, tape dispensing mechanism 28 and a head displacement device 61. The controller 55 may be a computer or a programmable logic controller (PLC). Although not shown, the controller 55 may typically include programmed instructions to calculate the number and placement of courses 22 required to layup a ply 52, and the various displacements that are necessary to move the head 20 in a programmed path optimized to form the layup 52 with maximum efficiency. The head displacement device 61 may comprise, for example and without limitation, a robotic device (not shown) upon which the head 20 may be mounted. The operation of the cutter 42, 42a is synchronized with the operation of the tape feed mechanism 28 and displacement of the head 20 so that the cutter 42, 42a cuts the tape 26 to form courses 22 of the desired length.

Figure 10:
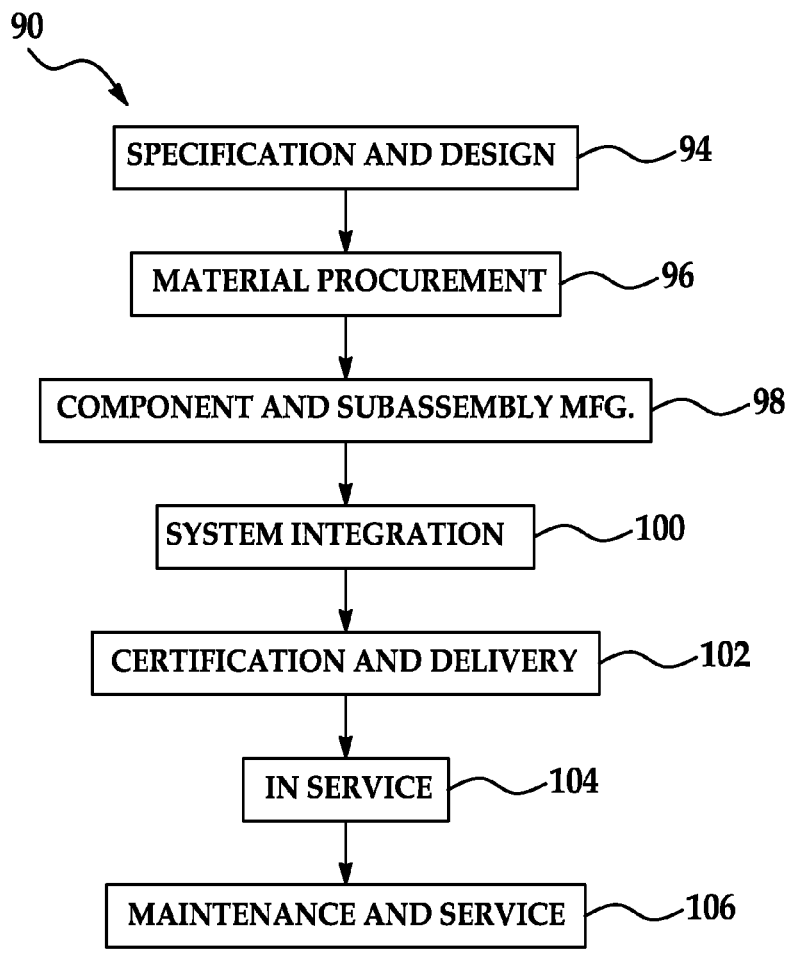
FIG. 10 is an illustration of a flow diagram of aircraft production and service methodology.
Figure 11:
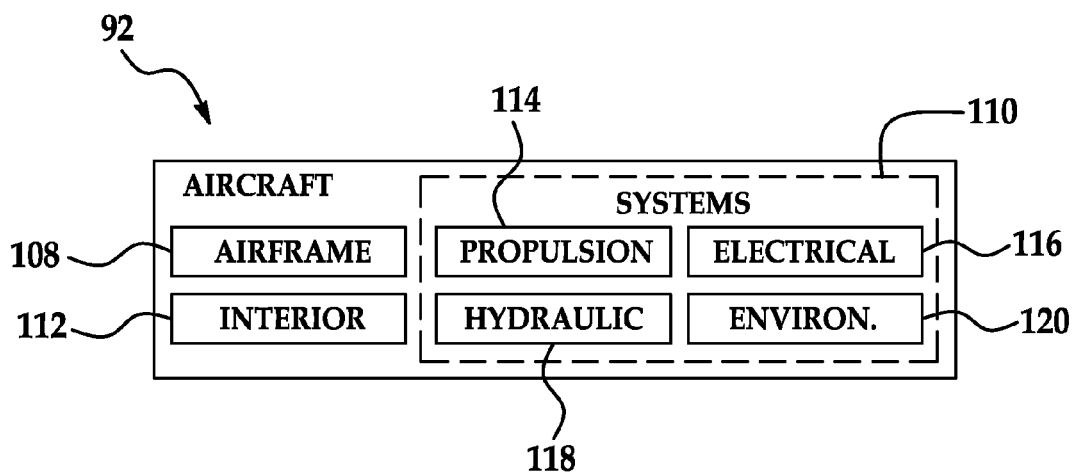
FIG. 11 is an illustration of a block diagram of an aircraft.

Embodiments of the disclosure may find use in a variety of potential applications, particularly in the transportation industry, including for example, aerospace, marine and automotive applications. Thus, referring now to FIGS. 10 and 11, embodiments of the disclosure may be used in the context of an aircraft manufacturing and service method 90 as shown in FIG. 10 and an aircraft 92 as shown in FIG. 11. During pre-production, exemplary method 90 may include specification and design 94 of the aircraft 92 and material procurement 96 in which the disclosed method and apparatus may be specified for use in laying up composite components requiring short courses of composite tape. During production, component and subassembly manufacturing 98 and system integration 100 of the aircraft 92 takes place. The disclosed method and apparatus may be used to layup components that are then assembled and integrated with other subassemblies.

Thereafter, the aircraft 92 may go through certification and delivery 102 in order to be placed in service 104. While in service by a customer, the aircraft 92 is scheduled for routine maintenance and service 106 (which may also include modification, reconfiguration, refurbishment, and so on). The disclosed embodiments may be used to layup components that may be used to replace components on the aircraft 92 during the maintenance and service 106.

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 92 produced by exemplary method 90 may include an airframe 108 with a plurality of systems 110 and an interior 112. Examples of high-level systems 110 include one or more of a propulsion system 114, an electrical system 116, a hydraulic system 118, and an environmental system 120. Any number of other systems may be included. Although an aerospace example is shown, the principles of the disclosure may be applied to other industries, such as the marine and automotive industries.

Systems and methods embodied herein may be employed during any one or more of the stages of the production and service method 90. For example, components or subassemblies corresponding to production process 98 may be fabricated or manufactured in a manner similar to components or subassemblies produced while the aircraft 92 is in service. Also, one or more apparatus embodiments, method embodiments, or a combination thereof may be utilized during the production stages 98 and 100, for example, by substantially expediting assembly of or reducing the cost of an aircraft 92. Similarly, one or more of apparatus embodiments, method embodiments, or a combination thereof may be utilized while the aircraft 92 is in service, for example and without limitation, to maintenance and service 106.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of cutting composite tape for placement on a substrate by an automatic tape placement head, comprising:
   feeding composite tape from a supply of the tape to a roller on the head;
   cutting the tape by a rotary cutter that contacts the roller while said tape is being fed; and
   using the roller to compact the cut tape against the substrate.

2. The method of claim 1, wherein a rotary cutter blade rotating to engage said tape.

3. The method of claim 1, wherein cutting the tape includes:
   using the roller as an anvil, and
   holding the tape against roller during the cutting.

4. The method of claim 1, wherein cutting the tape includes rotating a cutter blade in proximity to the roller such that the rotating blade cuts the tape against the roller.

5. A method of laying short courses of composite tape on a substrate using an automatic tape placement head, comprising:
   drawing tape from a supply of the tape on the head;
   feeding the tape through a guide on the head;
   using the guide to guide the tape toward a compaction roller;
   cutting the tape into a short course after the tape has moved through the guide, including rotating a cutter blade and using the rotating cutter blade to cut the short course of tape at the roller by cutting the tape against the roller, said blade contacting said roller during said cutting; and
   using the roller to compact the short course of tape against the substrate.

6. An automatic composite tape placement head, comprising:
   a roller for compacting tape on a substrate; and
   a cutter immediately adjacent the roller for cutting the tape at the roller; said cutter includes a rotary cutter blade that only rotates to engage said tape; said rotary cutter blade contacting said roller.

7. The tape placement head of claim 6, wherein the means for displacing the blade includes:
   means for mounting the blade for rotation in a direction opposite to the rotational direction of the roller, and
   a motor for rotating the blade.

8. The tape placement head of claim 6, further comprising;
   means for feeding the tape to the roller; and
   means for synchronizing the rotation of the rotary cutter with tape feeding means.

9. The tape placement head of claim 6, wherein the cutter is rotatable in a rotational direction opposite of the rotational direction of the roller.

10. An automatic tape placement head for placing composite tape on a substrate, comprising:
    a supply of tape;
    a roller for compacting the tape against the substrate as the head moves over the substrate;
    means for feeding tape from the tape supply to the roller; and,
    a rotary cutter for cutting the tape against the roller, said rotary cutter comprising a blade, said blade adapted to contact said roller during said cutting.

11. The automatic tape placement head of claim 10, wherein:
    the rotary cutter rotates in a direction opposite the rotational direction of the roller.

12. The automatic tape placement head of claim 10, wherein the roller and the cutter are respectively mounted for rotation about substantially parallel axes.

13. The automatic tape placement head of claim 10, further including means for synchronizing the operation of the cutter with the operation of the means for feeding the tape from the tape supply to the roller.

14. The automatic tape placement head of claim 10, wherein the cutter is positioned to cut the tape substantially at a tangent point on the surface of the roller.

15. The automatic tape placement head of claim 10, wherein the cutter is located between the tape feeding means and a point where the tape engages the roller.

16. An automatic tape placement head for placing short courses of composite tape on a substrate, comprising:
    a supply of composite tape;
    a compaction roller for compacting short courses of the tape onto the substrate as the head is moved relative to the substrate;
    guide means for guiding the tape from the supply onto the roller; and
    a rotary cutter including a cutter blade for cutting the tape that has been guided onto the roller, the rotary cutter blade being mounted for rotation in a direction opposite the direction of rotation of the compaction roller such that the cutter blade passes into proximity with a tangent point on the roller and cuts the tape generally at the tangent point on the roller.

* * * * *